United States Patent [19]

Bulick

[11] Patent Number: 4,868,441
[45] Date of Patent: Sep. 19, 1989

[54] BRUSH HOLDER ASSEMBLY

[75] Inventor: John G. Bulick, Dexter, Mich.

[73] Assignee: Ford Motor Company, Dearborn, Mich.

[21] Appl. No.: 219,688

[22] Filed: Jul. 11, 1988

[51] Int. Cl.$^4$ ............................................. H02K 13/00
[52] U.S. Cl. ..................................... 310/239; 310/42; 310/242; 310/247; 310/249
[58] Field of Search ............... 310/239, 240, 241, 242, 310/244, 245, 246, 247, 248, 249, 42; 29/597

[56] References Cited

U.S. PATENT DOCUMENTS

| | | | |
|---|---|---|---|
| 3,025,421 | 3/1962 | Sievert | 310/245 |
| 3,430,084 | 2/1969 | Hall et al. | |
| 3,430,915 | 3/1969 | Vogelsberg | 310/245 |
| 3,518,475 | 6/1970 | Sebok et al. | |
| 3,983,432 | 9/1976 | Rankin | |
| 4,371,803 | 2/1983 | Schindel et al. | |
| 4,389,588 | 6/1983 | Rankin | |

FOREIGN PATENT DOCUMENTS 0658776  4/1938  Fed. Rep. of Germany ...... 310/242
3010036  10/1981  Fed. Rep. of Germany ...... 310/242

OTHER PUBLICATIONS

"Random House Dictionary of the English Language", J. Stein; 1967; Random House/New York.

Primary Examiner—R. Skudy
Attorney, Agent, or Firm—Paul K. Godwin, Jr.; Clifford L. Sadler

[57] ABSTRACT

A brush holder assembly which utilizes an insulated brush card and a bridge means to define a receiving aperture for a brush element. A pair of legs and a connecting element serve to define the bridge means and a constant force spring is retained by the legs so that as the brush is received within the aperture, the spring will partially uncoil and the uncoiled portion of the spring will conform to the profile of the brush. The bridge means also includes a retention mechanism by which the brush may be held in an assembled position prior to its installation into a motor or generator unit.

8 Claims, 2 Drawing Sheets

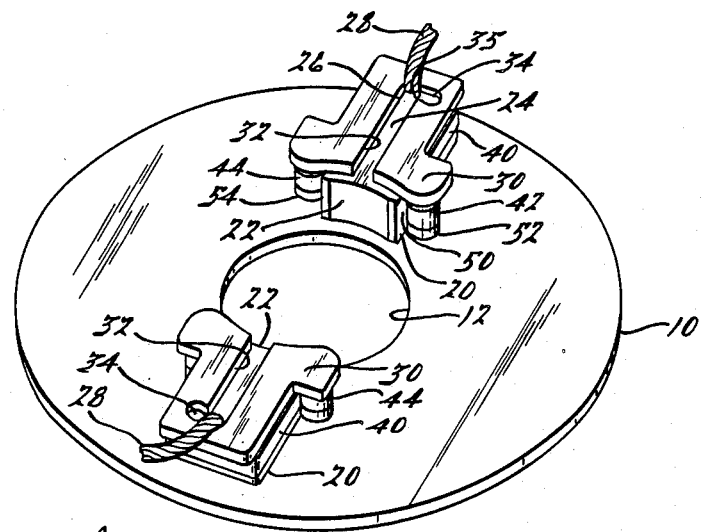
Fig. 1.
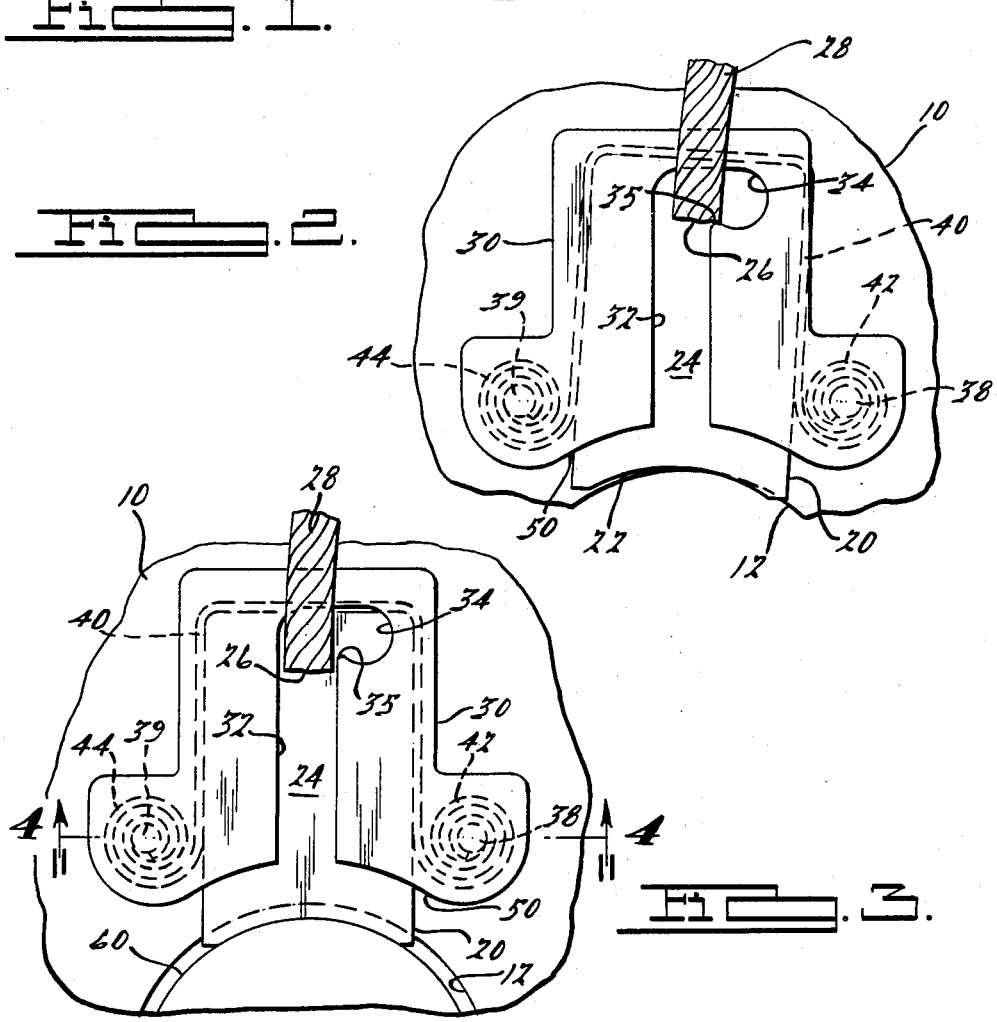
Fig. 2.
Fig. 3.

BRUSH HOLDER ASSEMBLY

BACKGROUND OF THE INVENTION

1. Field of the Invention

The present invention is directed to the field of electrical machines such as motors and generators and more specifically to the area of brush holders that are used to transfer electricity between stationary and rotating elements.

2. Description of the Prior Art

Prior art patents, such as U.S. Pat. No. 3,430,084; 3,518,475; 3,983,432; 4,389,588; and 4,371,803, illustrate the use of constant force twin coil springs within prefabricated brush boxes that each provide a guide way for a brush to move against a rotating conductor throughout its wear life. In each case, the brush box is formed with a recess in its forward end to accommodate the twin coils of the constant force spring and with a guide way having its internal dimensions configured to match and accept the brush. In each of the prior references which use the twin coil constant force spring in a brush box configuration, it is apparent that the preassembly of the brush and spring into the brush box prior to installation of the rotating conductor (such as the commutator of a motor) is complicated by the fact the springs and the brushes and springs have a tendency to fly apart, since they are biased to be disassembled in the absence of some type of spacer element positioned between the brushes.

SUMMARY OF THE PRESENT INVENTION

It is an object of the present invention to provide a simplified brush holder that provides retaining mechanisms for both the constant force spring and the brush in a fully retracted position prior to assembly into a machine such as a motor or generator.

It is another object of the present invention to provide a simplified brush holder in which the spring forces that bias the brush against the rotating conductor provide lateral support to retain the brush and also retain the brush holder in a predetermined position on its support means.

It is a further object of the present invention to utilize the brush/wire connection on the brush in conjunction with an elongated slot above the brush to provide a guide for directing the brush towards the rotating commutator.

The above objectives are achieved in the invention disclosed and claimed herein. The invention is intended for use in conjunction with an electric motor or generator in which electricity is to be transferred between a rotating conductor and an electrically conducting brush that is biased to make contact with the rotating conductor. In the case of an electric motor, the rotating conductor is in the form of a commutator having several individual conducting surfaces. In the case of a generator, the rotating conductor may be in the form of a slip ring. For convenience, the following description and pictured embodiment make reference to a commutator as the rotating conductor. However, the invention is equally applicable to any situation where brushes are held biased to make contact with a relatively movable and conducting surface.

A support element, commonly termed a "brush card" is provided as a means for rigidly supporting the brush holder. In a motor, the brush card is located in a position that is adjacent to the location of the commutator. The brush card is preferably an insulator substrate that is rugged enough to withstand the vibrations and temperatures of the motor operation, while maintaining the brush holders in predetermined positions with respect to the rotating commutator. In the preferred embodiment, the brush card contains a pair of apertures with parallel slots for receiving and retaining the legs of each brush holder.

The brush holder is an improvement, as compared to the prior art, since it has a simplified structure and a mechanism for retaining the brush within the holder. A bridge element is formed by a pair of legs and a connecting element. One end of each leg is attachable to the brush card and the connecting element is rigidly attached between the other ends of the legs. The combination of the bridge means and the adjacent surface of the brush card defines an aperture into which the brush element may be received.

Spring means extend between the legs and are used for biasing the brush element received in the aperture in a manner that forces the brush towards the rotating commutator. A twin helical coil constant force spring is shown as the preferred spring means with the legs of the bridge means extending through each of the helical coils.

BRIEF DESCRIPTION OF THE DRAWINGS

FIG. 1 is a perspective view of a pair of brush holders of the present invention shown in the absence of a rotating commutator.

FIG. 2 is top plan view of a brush holder of the present invention shown in its latched position prior to assembly into a motor.

FIG. 3 is a top plan view of the brush holder of the present invention shown in its unlatched position with the brush element biased against the rotating conducting means.

DETAILED DESCRIPTION OF THE PREFERRED EMBODIMENT

Figure 4:
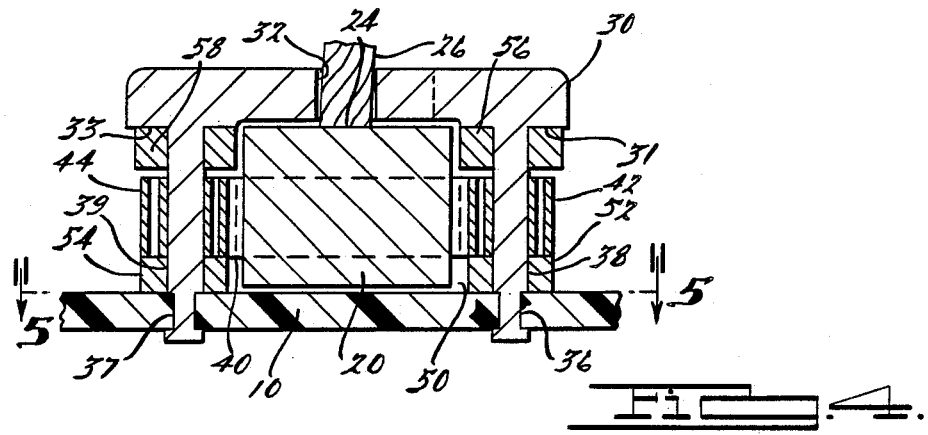
FIG. 4 is a cross-sectional view of the brush holder illustrated in FIG. 3, taken along line 4—4.

In FIG. 1, a pair of brush holders of the present invention are illustrated. The brush holders are shown mounted onto a brush card substrate 10 and opposing each other across a central aperture 12. The central aperture 12 is formed to be larger than a rotating conducting element (commutator 60 in FIG. 3) that is used in the assembled motor. In each brush holder, a carbon brush 20 is positioned and biased with a constant force spring 40 so as to make contact with the rotating commutator 60. Contact with that element is made through the concave shaped front surface 22. A lead wire 28 extends from the upper surface 24 of the brush 20. The connection of lead wire 28 is made at a point 26 and may be performed during the process of molding the brush.

By referring to FIGS. 1 and 4, it can be seen that a connecting plate element 30 and a pair of legs 38 and 39 extending therefrom are connected to the brush card substrate 10. The connecting plate element 30, along with the legs 38 and 39 serve to form a bridge over the brush element 20 and define an aperture 50 into which the brush is to be received during assembly and retained during use.

In FIGS. 1, 2, 3, 4 and 6, the connecting plate element 30, preferably formed of an insulating material, is shown as containing a guide-way slot 32. The guide-way slot 32 is open at the forward end (defined as being adjacent the aperture 50), so as to receive the lead wire 28 extending from the top surface 24 of the brush 20 during assembly, and to provide a guide to subsequent movement of the brush as it wears during its life within the brush holder. At the opposite and closed end of the guide-way 32, is an offset aperture 34 and a retaining point 35. The retaining point 35 and the offset aperture 34 serve to provide sufficient clearance for latching the brush in a retracted position prior to assembly in the motor.

The constant force spring 40 includes twin helical coils 42 and 44 separated by an uncoiled flat portion 46. The coils 42 and 44 are mounted so as to encircle respective legs 38 and 39 with sufficient clearance to minimize friction therebetween.

Figure 5:
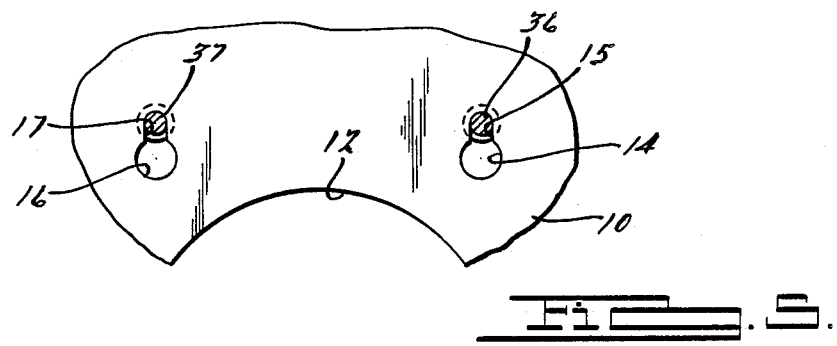
FIG. 5 is a cross-sectional view of the brush holder illustrated in FIG. 4, taken along line 5—5.

In FIG. 5, the brush card substrate 10 is shown as containing a pair of apertures 14 and 16 for each brush holder location. The apertures 14 and 16 are large enough to receive the ends of legs 38 and 39, respectively. The apertures 14 and 16 respectively contain slots 15 and 17 that extend away from the major aperture 12 and are of a size that will correspondingly receive and retain indented portions 36 and 37 of legs 38 and 39.

Figure 6:
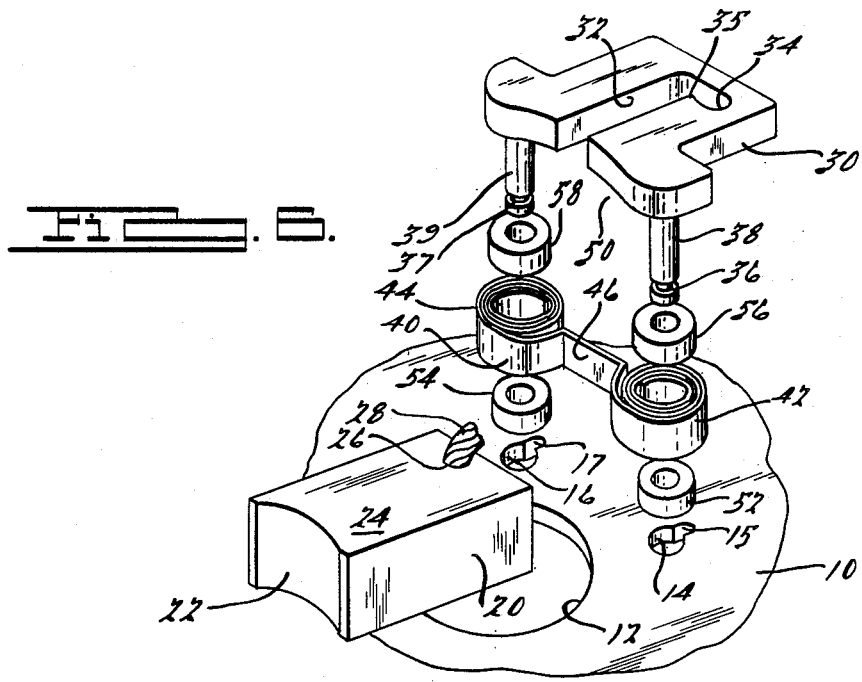
FIG. 6 is an exploded view that separately illustrates the elements shown in previous FIGS. 1–5.

From FIG. 6, it can be seen that during initial assembly of the brush holder onto the brush card 10, spacers 56 and 58 and the spring coils 42 and 44 are slipped over the legs 38 and 39. The spacers 56 and 58 are positioned beneath and adjacent the lower surfaces 31 and 33 of the plate element 30 surrounding the respective legs 38 and 39. Spacers 56 and 58 serve to limit the upward location of the spring coils and center the flat portion 46 of the spring 40 with respect to the height dimension of the brush 20. Subsequently, spacers 52 and 54 are positioned beneath the spring coils 42 and 44. Spacers 52 and 54 are mounted on legs 38 and 39, beneath the respective coils 42 and 44 so as to elevate the spring 40 with respect to the surface of the brush card 10. The ends of legs 38 and 39 are inserted into the apertures 14 and 16 and the indented portions 36 and 37 are respectively slipped into slots 15 and 17 for frictional retention. (Of course, conventional attachment techniques may be substituted in order to connect the legs to the brush card, depending upon the nature of assembly process employed in fabricating the motor or generator units.)

The brush 20 is inserted into the defined aperture 50 so that its lead wire 28 enters the guide-way slot 32. This insertion mates the rear of the brush 20 with the uncoiled flat portion 46 of the spring 40 and the coils 42 and 46 partially unwind from around the legs as insertion continues. Against the force of the spring 40, the brush 20 is received within the aperture 50 until the lead wire connection 26 is near the rear of the guide-way slot 32. At that point, the brush 20 may be latched into its fully retracted position against the force of the spring 40 by displacing the rear of the brush 20 until the lead wire connection 26 enters the offset aperture 34 and is caught by retaining point 35, as shown in FIG. 2. The force of the spring 40 causes the connection 26 and the brush 20 to be retained in a manner which allows for the brush to be installed in the assembly prior its incorporation in the motor.

During the build up of the motor and as shown in FIG. 3, the commutator 60 is inserted into the aperture 12 and the brush is subsequently released from its latched position so that it is biased by the spring 40 against the conducting surfaces of the commutator 60 for the remainder of its wear life. If subsequent repair of the motor is necessary, the brushes may be again latched in their retracted positions so that they will not become inadvertently disassembled when the commutator is removed.

It will be apparent that many modifications and variations may be implemented without departing from the scope of the novel concept of this invention. Therefore, it is intended by the appended claims to cover all such modifications and variations which fall within the true spirit and scope of the invention.

I claim:

1. A brush holder for use in a machine in which electricity is to be transferred between a rotatable conductor and an electrically conducting brush element biased to make contact with said rotatable conductor, comprising:

means positioned adjacent the location of said rotatable conductor for rigidly supporting said brush holder;

bridge means formed with a pair of legs having one end of each leg connected to said supporting means and with a connecting element rigidly attached to the opposite ends of said legs, wherein said bridge means along with said supporting means define an aperture to receive an electrically conducting brush element; and spring means extending between said legs for biasing said brush element received in said aperture towards said rotatable conductor, including a single strip of resilient metal formed to have helical coils formed at each end separated by an uncoiled section, said coils of said spring means are positioned to surround a portion of each leg, said uncoiled section extends across said aperture to contact said brush element, and said coils are partially unwound when said brush element is received within said aperture and provides a constant bias to force said brush element against said rotatable conductor;

wherein said brush element has a lead wire conductor extending therefrom and said bridge means includes means for catching said lead wire to releasably retain said brush element in a fully received position within said aperture and against the force of said spring means away from contacting said rotatable conductor during assembly or disassembly of said machine.

2. A brush holder as in claim 1, wherein said lead wire conductor of said brush element extends from a defined upper surface of said brush element opposite to the location of the support means and said connecting element of said bridge means contains a slot opening extending from said aperture which allows said lead wire conductor to extend therethrough, defines a movement path for said lead wire, and contains a means at its opposite end for releasably retaining said lead wire when said brush element is in a fully received position within said aperture.

3. A brush holder as in claim 2, wherein said releasably retaining means in said slot is an enlarged opening, in direct communication with the end of said slot, which allows the lead wire to be offset from its movement path defined by said slot and held in said enlarged opening by the force of said spring means.

4. A brush holder for use in a machine in which electricity is to be transferred between a rotatable conductor and an electrically conducting brush element biased to make contact with said rotatable conductor, comprising:

means positioned adjacent the location of said rotatable conductor for rigidly supporting said brush holder;

bridge means formed with a pair of legs having one end of each leg connected to said supporting means and with a connecting element rigidly attached to the opposite ends of said legs, wherein said bridge means along with said supporting means define an aperture to receive an electrically conducting brush element;

spring means extending between said legs for biasing said brush element received in said aperture towards said rotatable conductor, including a single strip of resilient metal formed to have helical coils formed at each end separated by an uncoiled section, said coils of said spring means are positioned to surround a portion of each leg and said uncoiled section extends across said aperture to contact said brush element, and said coils are partially unwound when said brush element is received within said aperture and provides a constant bias to force said brush element against said rotatable conductor; and first spacer element on each leg located between said coils of said spring means and said supporting means for locating said spring above the surface of said supporting means and in the approximate center of the height dimension of said brush element.

5. A brush holder as in claim 4, which further comprises a second spacer element on each leg, located between said coils of said spring means and bridge element for preventing said coils of said spring means from moving above said approximate center of the height of said brush element.

6. A brush holder for use in a machine in which electricity is to be transferred between a rotatable conductor and an electrically conducting brush element biased to make contact with said rotatable conductor, comprising:

means positioned adjacent the location of said rotatable conductor for rigidly supporting said brush holder;

bridge means formed with a pair of legs having one end of each leg connected to said supporting means and with a connecting element rigidly attached to the opposite ends of said legs, wherein said bridge means along with said supporting means define an aperture to receive an electrically conducting brush element;

spring means extending between said legs for biasing said brush element received in said aperture towards said rotatable conductor, including a single strip of resilient metal formed to have helical coils formed at each end separated by an uncoiled section, said coils of said spring means are positioned to surround a portion of each leg and said uncoiled section extends across said aperture to contact said brush element and said coils are partially unwound when said brush element is received within said aperture and provides a constant bias to force said brush element against said rotatable conductor;

wherein said supporting means contains a pair of apertures spaced apart a distance appropriate to accept insertion of said legs therein, and relatively narrow closed end slots extending parallelly away from said apertures, and said legs have necked down portions cross-sectionally dimensioned to laterally slide into said slots while the remainder of said legs are prevented by their larger cross-sectional dimensions from further movement with respect thereto.

7. A brush holder as in claim 6, wherein said legs are retained in said slots in said supporting means be the biasing force of said spring means compressing said brush element against said rotatable conductor.

8. A brush holder for use in an electric motor in which electricity is to be transferred to a rotatable commutator from electrically conducting brush elements biased to make contact with conducting elements of said rotatable commutator, comprising:

means positioned adjacent the location of said rotatable commutator for rigidly supporting said brush holder;

bridge means formed with a pair of legs having one end of each leg connected to said supporting means and with a connecting element rigidly attached to the opposite ends of said legs, wherein said bridge means along with said supporting means define an aperture to receive an electrically conducting brush element;

spring means retained by and extending between said legs for providing constant force biasing to said brush element received in said aperture towards said rotatable commutator; and means on said bridge means for releasably latching said brush element in a fully inserted position within said aperture against the constant biasing force of said spring means;

wherein said brush element includes an electrical wire extending therefrom and said latching means includes a retaining point on said bridge means that is displaced from the operational movement both of said brush element and said extending wire.

* * * * *